United States Patent
Stewart et al.

[11] 3,795,032
[45] Mar. 5, 1974

[54] METHOD FOR MAKING A CENTER GEAR CRANKSHAFT

[75] Inventors: William F. Stewart; John B. Whittingham, both of Petersborough; Geoffrey R. Perkins, Bourne, all of England

[73] Assignee: Perkins Engines Limited, Petersborough, England

[22] Filed: Jan. 12, 1972

[21] Appl. No.: 217,128

[30] Foreign Application Priority Data
Jan. 19, 1971 Great Britain ............ 2452/71

[52] U.S. Cl. ............................................. 29/6
[51] Int. Cl. ............................................. B21k 1/08
[58] Field of Search ................................. 29/6

[56] References Cited
UNITED STATES PATENTS
2,899,742   8/1959   Wilson ................... 29/6
2,403,049   7/1946   Carstens ................. 29/6

FOREIGN PATENTS OR APPLICATIONS
683,085    11/1952   Great Britain ............ 29/6
1,056,870  10/1953   France .................... 29/6
710,263    10/1953   Germany .................. 29/6

Primary Examiner—Andrew R. Juhasz
Assistant Examiner—Leon Gilden
Attorney, Agent, or Firm—Thomas P. Lewandowski

[57] ABSTRACT

Method of constructing a crankshaft incorporating a timing driving wheel includes forming a crankshaft having a crank disposed on opposite sides of a main bearing region, machining and treating the bearing surfaces of the crankshaft, preparing a machined cylindrical datum area on the surface of said main bearing region, cutting through said datum area to separate the crankshaft into two portions, locating a machined and treated timing wheel between the severed ends of said portions, accurately aligning the driving wheel in co-axial relationship with the parts of said datum area on each of said portions, and welding the resulting assembly together by a local welding method.

6 Claims, 4 Drawing Figures

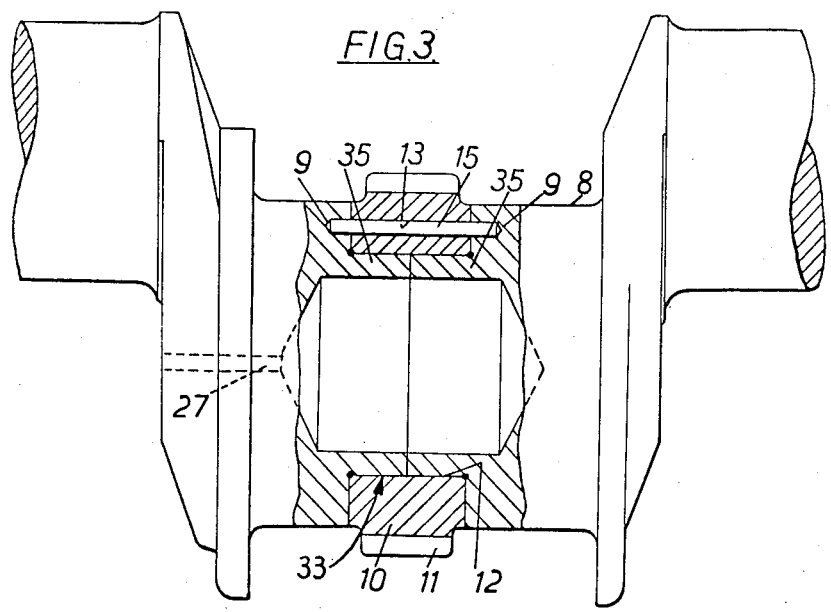
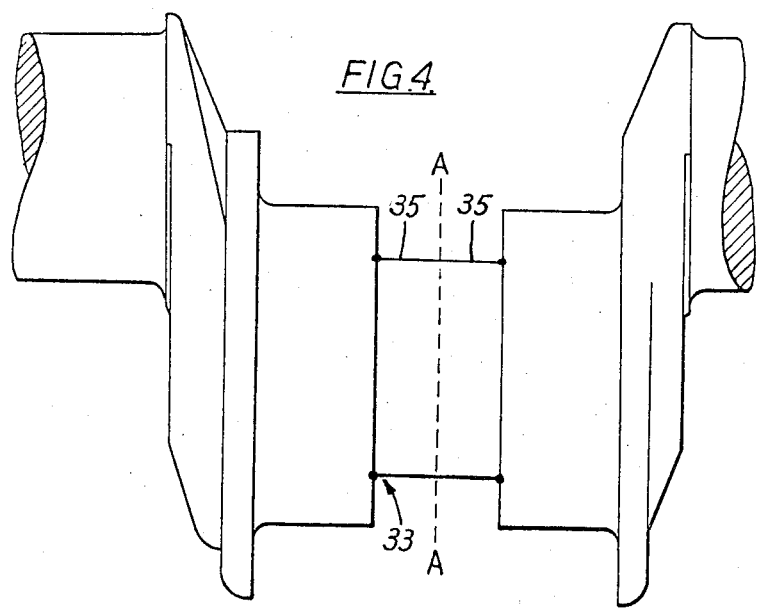

METHOD FOR MAKING A CENTER GEAR CRANKSHAFT

This invention relates to multiple crankshafts which incorporate a driving wheel for driving timing apparatus.

Crankshafts having a gear wheel located at the midpoint of the length of the crankshaft are known and they have been built integrally by forming the blank of the crankshaft and the timing gear wheel and thereafter machining the blank to the desired extent. The gear wheel blank in this process has tended to make the machining of the crankshaft bearing surfaces more difficult, and similarly, the presence of the crankshaft attached integrally with the gear wheel blank has caused difficulty in machining of the teeth of the gear wheel.

It is an object of the present invention to obviate or mitigate the above disadvantages.

According to the present invention there is provided a method of constructing a crankshaft incorporating a driving wheel suitable for driving timing apparatus, comprising the steps of forming a crankshaft having a crank disposed on opposite sides of a main bearing region, machining and treating the bearing surfaces of the crankshaft, preparing a machined cylindrical datum area on the surface of said main bearing region, cutting rhrough said datum area to separate the crankshaft into two portions, locating a machined and treated driving wheel, suitable for driving timing apparatus, between the severed ends of said portions, accurately aligning the driving wheel in co-axial relationship with the parts of said datum area on each of said portions, and welding the resulting assembly together by a local welding method.

The driving wheel may be in the form of a gear wheel or it may be suitable for a chain or belt-drive system.

Embodiments of the present invention will now be described by way of example with reference to the accompanying drawings, in which:

FIG. 3 is a view similar to FIG. 1 but illustrating a second modification of crankshaft manufactured according to the present invention; and FIG. 4 is a side elevation of crankshaft blank after machining, which is used to form the composite crankshaft of the second embodiment.

In the method according to the present invention the crankshaft is formed by firstly forming a standard crankshaft, i.e., one which does not incorporate a driving wheel along its length, cutting the standard crankshaft into two portions, inserting a machined driving wheel between the severed portions, and welding the assembly together.

Figure 1:
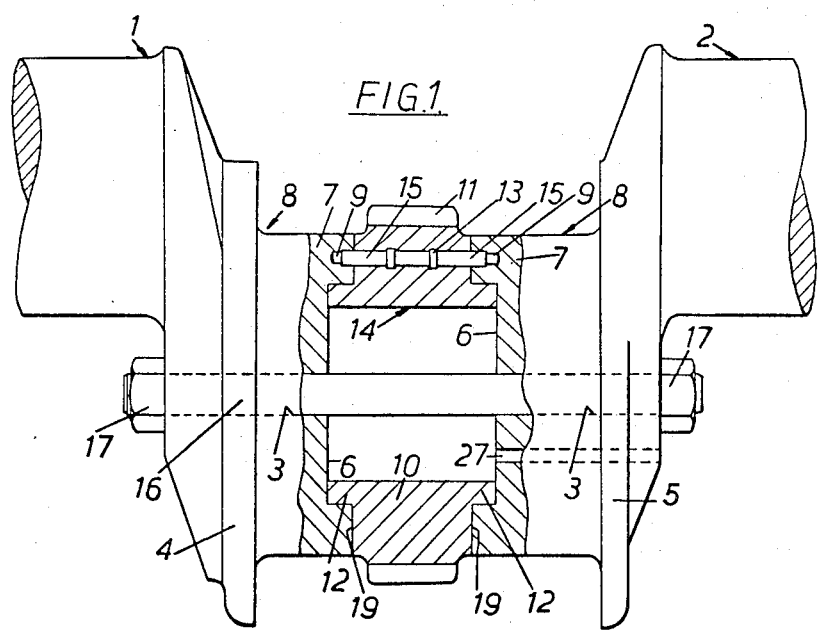
FIG. 1 is a side elevation, partially cut away to show detail, of a first embodiment of crankshaft manufactured according to the present invention.

FIG. 1 of the drawings shows the two portions of the standard crankshaft 1, 2 separated by a driving wheel 10, the assembly being secured together by a nut and threaded rod arrangement 16, 17 and the angular orientation of the crank webs 4, 5 being determined by a small spigot and socket arrangement 9, 13, 15.

In the assembly of the crankshaft an annular machined surface is created on the inter web region of the standard crankshaft which supports the main bearing surface 8, the machined surface acting as a datum area for the subsequent handling of the crankshaft. In FIG. 1 the datum area forms part of the main bearing surface 8 and after the crankshaft has been separated into two portions by cutting through the datum area a shallow socket 6 of relatively large diameter is machined in the end 7 of each portion co-axially with the datum area, i.e., co-axially with the main bearing surface 8. A relatively small diameter hole 3 is also bored co-axially with the datum area, the hole 3 extending right through the crank webs 4, 5. A blind hole 9, offset from the axis of the bearing 8 is also provided in each crankshaft portion.

The timing wheel 10 has teeth 11 formed in a manner known per se, and spigots 12 are presented on opposite sides of the wheel 10, the spigots being for registration with the sockets 6. Also, two co-axial bores 13 of the same diameter as the holes 9 are formed at such a location as to enable dowel pins 15 to enter bores 9, 13 when the assembly is correctly aligned, thereby to locate the crank webs in the correct angular position. A bore 14 is provided to permit the rod 16 to pass through.

To ensure the quality of the finished crankshaft the sockets 6 are carefully machined to close tolerances, both as regards diameter and axial position and similarly the holes 9 are positioned to within close tolerances both as to radial distance from the axis of the main bearing surface 8 and as to angular orientation, this being facilitated by the part of the datum area on each crankshaft portion. Conveniently the holes 9 are situated in the plane containing the axis of the main bearing surface 8 and that of a crank bearing surface. The spigots 12 on the timing wheel 10 are likewise machined to close tolerances both as to diameter and as to centricity and the thickness of the wheel 10 between the faces 19 is carefully controlled since it determines the dimensions of the composite crankshaft.

On assembly, the dowel pins 15 are inserted in the holes 9 and/or 13, the wheel 10 is located between the two crankshaft portions 1, 2, the rod 16 threaded at its ends is passed through the holes 3 and 14 and the nuts 17 are threaded on to the rod 16. When the nuts 17 are tightened they bear against the crank webs 4, 5 and press the assembly together. The spigots 12 are then entered into the sockets 6 in which they are an interference fit and the dowel pins 15 angularly align the components of the assembly.

When the spigots are fully home in the sockets the assembly is welded together by a local welding operation, such as laser welding or electron beam welding, so that the assembly becomes unitary permitting the nuts 17 and rod 16 to be removed after cooling. At least one air vent 27 is provided in the crankshaft to permit expanding gases to escape during the welding operation.

Figure 2:
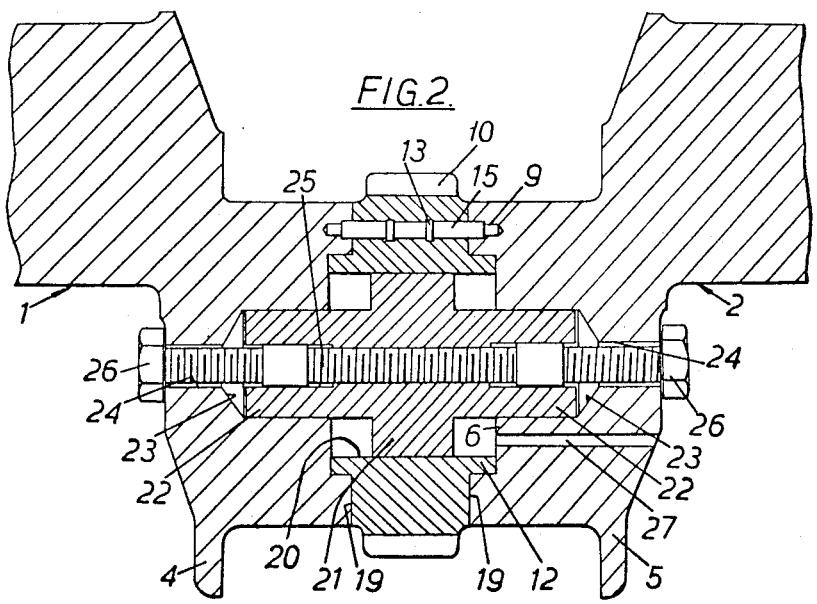
FIG. 2 is a cross-section on the center line showing a modification of the embodiment of FIG. 1.

The crankshaft shown in FIG. 2 is generally similar in construction to that of FIG. 1 but the main difference is that the gear wheel 10 in addition to having opposed spigots, has a large central bore 20 in which is loosely located a tie member 21 having opposite bosses 22 projecting into large recesses 23 formed within the sockets in the ends of the crankshaft portions. Holes 24 extend through the webs 4, 5 and the bosses have threaded holes 25 into which bolts 26 can enter. The bolts 26 are tightened to make the assembly ready for welding and are released thereafter.

The method of manufacturing and assembling the crankshaft of FIG. 2 is similar to that described above for FIG. 1, suitable modifications being made in respect of the clamping together of the various components in view of the structural differences illustrated.

FIG. 3 illustrates a further embodiment of crankshaft manufactured according to the present invention and in this case the datum area is in the form of a cylindrical groove 33 of reduced diameter with respect to the bearing surface 8. FIG. 4 shows the standard crankshaft prior to the cutting operation and the shape of the groove 33 is clearly illustrated. The inner corners of the groove 33 may be slightly under-cut to prevent binding during assembly. It will be seen that after cutting along the line A—A, the reduced diameter portion 35 in the groove 33 will constitute a spigot co-axial with the main bearing surface 8 having been machined at the same time as the latter.

The drive wheel 10, as shown in FIG. 3 is provided with a through bore 12 which forms a socket for each of the spigots formed by the portion 35.

The standard of tolerances required in the embodiment of FIG. 3 is similar to that for FIGS. 1 and 2 and the assembly of this embodiment is as previously described except that the rod 16 and nut 17 assembly is omitted and axially directed forces are imposed on the crankshaft ends by means, not shown.

By virtue of the method of forming crankshafts according to the present invention it is possible to provide a crankshaft which after the welding operation can be installed directly in an engine, further machining not being required. Possibly some small fettling treatment of welding flash might be required but it will be appreciated that the present invention therefore substantially eliminates the problems hitherto encountered in the manufacture of crankshafts of the kind in question.

What we claim is:

1. A method of constructing a crankshaft incorporating a driving wheel suitable for driving the timing apparatus, comprising the steps of forming a crankshaft having a crank disposed on opposite sides of a main bearing region, machining and treating the bearing surfaces of the crankshaft, preparing a machined cylindrical datum area on the surface of said main bearing region, said datum area being undercut with respect to the bearing surface on said main bearing region, cutting through said datum area to separate the crankshaft into two portions with the parts of said datum area on each of said portions forming a spigot, locating a machined and treated driving wheel which is suitable for driving timing apparatus and which has axially-disposed socket means between the severed ends of said portions, accurately aligning the driving wheel in co-axial relationship with said datum area by entering said spigots in said socket means and welding the resulting assembly together by a local welding method.

2. The method according to claim 1, wherein said socket means is formed by a through bore in the driving wheel.

3. The method according to claim 1, wherein the step of accurate alignment includes providing interengagable means on each said portion and on said driving wheel for ensuring mutual angular alignment of said cranks after said welding operation.

4. The method according to claim 3, wherein said means is in the form of registrable spigot and socket members.

5. The method according to claim 1, wherein said welding method is electron beam welding.

6. The method according to claim 1, wherein said welding method is laser welding.

* * * * *